(12) United States Patent
Kobayashi et al.

(10) Patent No.: US 8,729,855 B2
(45) Date of Patent: May 20, 2014

(54) NON-CONTACT CHARGING MODULE AND NON-CONTACT CHARGER

(75) Inventors: Naoyuki Kobayashi, Oita (JP); Tokuji Nishino, Oita (JP); Kenichiro Tabata, Oita (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/990,901

(22) PCT Filed: Dec. 28, 2011

(86) PCT No.: PCT/JP2011/007346
§ 371 (c)(1),
(2), (4) Date: May 31, 2013

(87) PCT Pub. No.: WO2012/104954
PCT Pub. Date: Aug. 9, 2012

(65) Prior Publication Data
US 2013/0300360 A1    Nov. 14, 2013

(30) Foreign Application Priority Data

Feb. 1, 2011 (JP) ................................. 2011-019481
Feb. 1, 2011 (JP) ................................. 2011-019482

(51) Int. Cl.
*H02J 7/00* (2006.01)
(52) U.S. Cl.
USPC ............ 320/108; 320/110; 320/114; 320/115
(58) Field of Classification Search
CPC ........................................................ H02J 7/025
USPC ........................................................ 320/108
See application file for complete search history.

(56) References Cited

U.S. PATENT DOCUMENTS

2009/0284341 A1*  11/2009  Okada et al. .................. 336/232
2010/0320843 A1    12/2010  Kitamura et al.

FOREIGN PATENT DOCUMENTS

| JP | 62-115813 A   | 5/1987  |
|----|---------------|---------|
| JP | 04-133408 A   | 5/1992  |
| JP | 05-290229 A   | 11/1993 |
| JP | 11-176676 A   | 7/1999  |
| JP | 2000-252143 A | 9/2000  |
| JP | 2003-045731 A | 2/2003  |
| JP | 2006-042519 A | 2/2006  |

(Continued)

OTHER PUBLICATIONS

International Search Report for PCT/JP2011/007346 dated Apr. 3, 2012.

*Primary Examiner* — Edward Tso
*Assistant Examiner* — Ahmed Omar
(74) *Attorney, Agent, or Firm* — Pearne & Gordon LLP

(57) ABSTRACT

A non-contact charging module with which reduction in thickness can be achieved while reliable insulation is maintained between conducting wire and magnetic sheet. This non-contact charging module comprises: a planar coil section (2) constituted by coiling a conducting wire; a conductive magnetic sheet (3) having the planar coil section (2) arranged thereon, with an insulating sheet (4) therebetween; and a recess (33) or slit (34) provided in the conductive magnetic sheet (3) and extending to an edge of the conductive magnetic sheet (3) from the starting point of the winding of the planar coil section (2). The conducting wire of the planar coil section (2) is stored in the recess (33) or slit (34) by the insulating sheet (4) being pushed into the recess (33) or slit (34). The conducting wire of the planar coil section (2) is insulated from the conductive magnetic sheet (3) by the insulating sheet (4).

9 Claims, 6 Drawing Sheets

(56) References Cited

FOREIGN PATENT DOCUMENTS

| JP | 2008-210861 A | 9/2008 | | |
| JP | 2008-210863 A | 9/2008 | | |
| JP | 2008210861 | * 9/2008 | ............. | H01F 27/36 |
| JP | 2009-200174 A | 9/2009 | | |

* cited by examiner

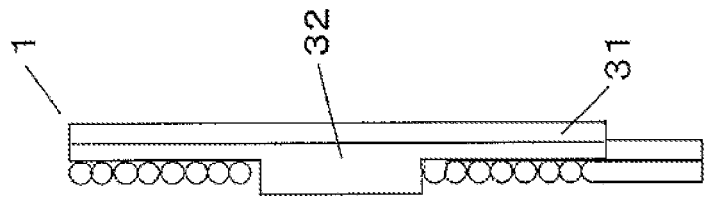
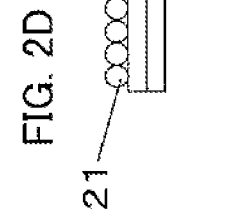
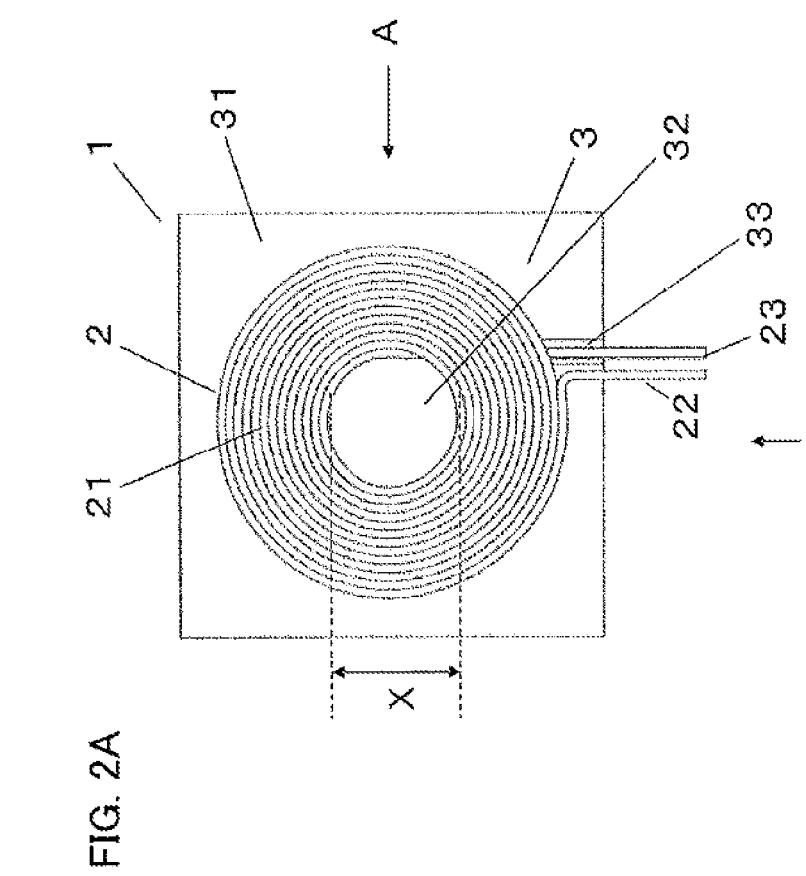
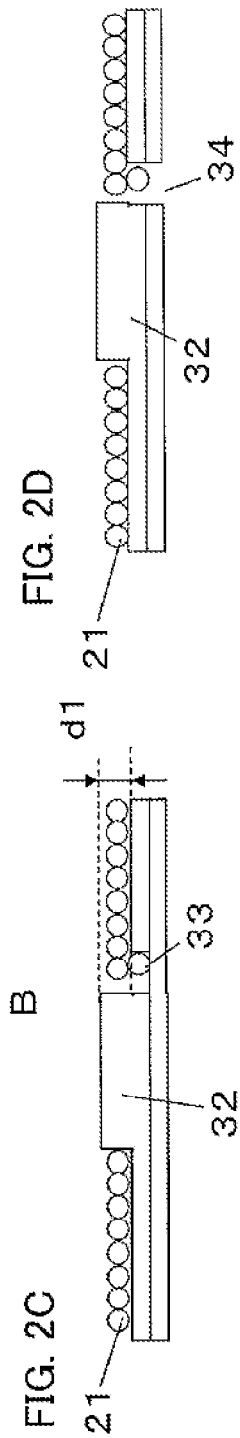

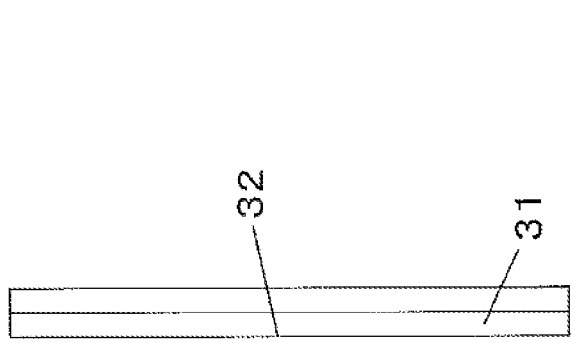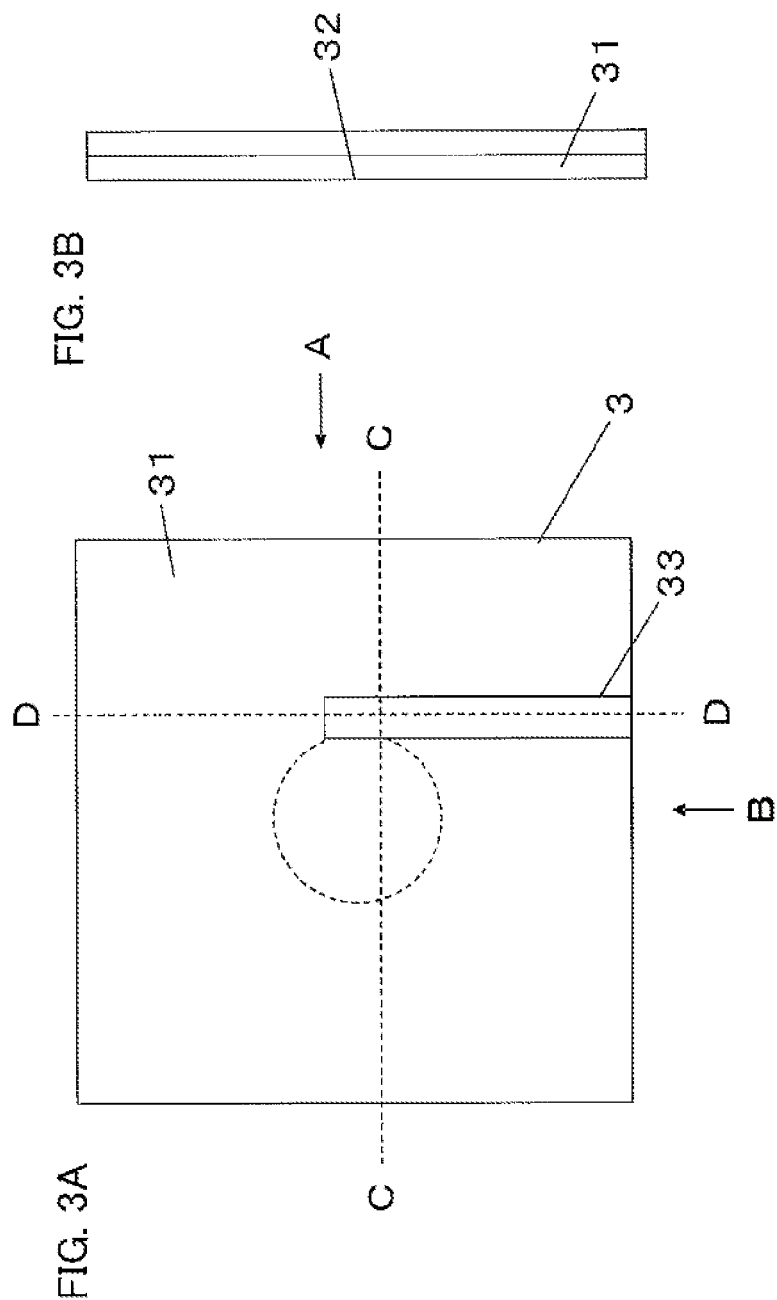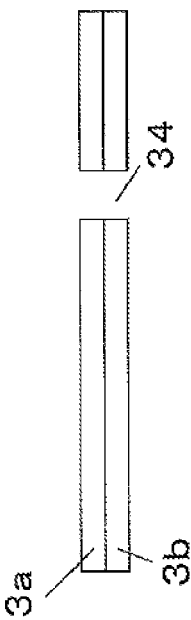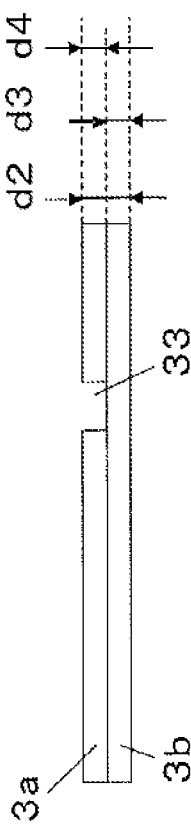

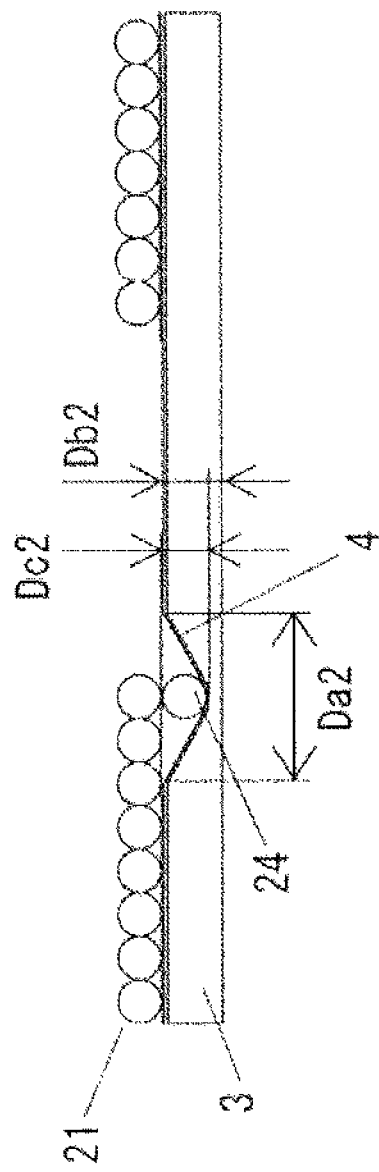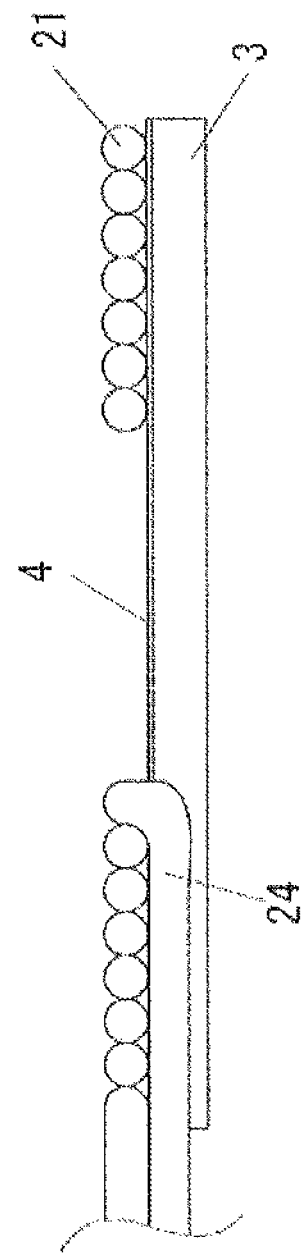

NON-CONTACT CHARGING MODULE AND NON-CONTACT CHARGER

TECHNICAL FIELD

The present invention relates to a non-contact charging module and a non-contact charger including a magnetic sheet, and a plane coil section including a wound conducting wire.

BACKGROUND ART

In recent years, use of a system which enables charging of a main apparatus by a charger in a non-contact manner has become widespread. Such a system includes a power transmission coil on the charger side, and a power reception coil on the main apparatus side. Electromagnetic induction is generated between the coils, whereby electric power is transmitted from the charger side to the main apparatus side. In addition, it has been proposed to apply a portable terminal apparatus or the like as the main apparatus.

The main apparatus such as the portable terminal apparatus and the charger are preferably reduced in thickness and size. In order to meet such a demand, a non-contact charging module including plane coil sections serving as a power transmission coil and a power reception coil, and magnetic sheets may be employed as disclosed in Japanese Patent Application Laid-Open No. 2006-42519 (Patent Literature (hereinafter, abbreviated as PTL) 1).

CITATION LIST

Patent Literature

PTL 1
Japanese Patent Application Laid-Open No. 2006-42519

SUMMARY OF INVENTION

Technical Problem

However, in the non-contact module including a plane coil section formed of one conducting wire and a magnetic sheet entirely formed in a plane shape as disclosed in PTL 1, the winding start portion or winding end portion of the coil is located under the inner side of the coil in some cases. In such cases, a wound portion of the coil and a portion between the winding start portion or winding end portion of the coil and a terminal overlap in the thickness direction as in a case where a plurality of conducting wires is used. Such overlapping prevents a reduction in thickness of the non-contact charging module as a result.

In addition, since some magnetic sheet is conductive, insulation between the conducting wire and the magnetic sheet is important when such a conductive magnetic sheet is used.

Therefore, in view of the above-mentioned problems, it is an object of the present invention to achieve a reduction in thickness in a state in which the conducting wire and the magnetic sheet are surely insulated from each other.

Solution to Problem

In order to solve the problems, an aspect of the present invention provides a non-contact charging module including: a plane coil section including a wound conducting wire; a magnetic sheet having electric conductivity on which the plane coil section is placed with an insulation sheet interposed therebetween; and a recessed portion or a slit provided in the magnetic sheet and extending from a winding start point of the plane coil section to an end of the magnetic sheet, in which the conducting wire of the plane coil section is pressed against the insulation sheet into the recessed portion or the slit and is thereby housed in the recessed portion or the slit, and the conducting wire of the plane coil section is insulated from the magnetic sheet having electric conductivity because of the insulation sheet.

Advantageous Effects of Invention

According to the present invention, it is possible to achieve a reduction in thickness in a state in which the conducting wire and the magnetic sheet are surely insulated from each other.

BRIEF DESCRIPTION OF DRAWINGS

FIGS. 2A to 2D are conceptual diagrams of the non-contact charging module in the embodiment of the present invention;

FIGS. 3A to 3D are conceptual diagrams of a magnetic sheet of the non-contact charging module in the embodiment of the present invention;

FIGS. 6A and 6B are sectional views of the magnetic sheet in which the slit is formed and the plane coil section in the embodiment of the present invention.

DESCRIPTION OF EMBODIMENTS

Figure 1:
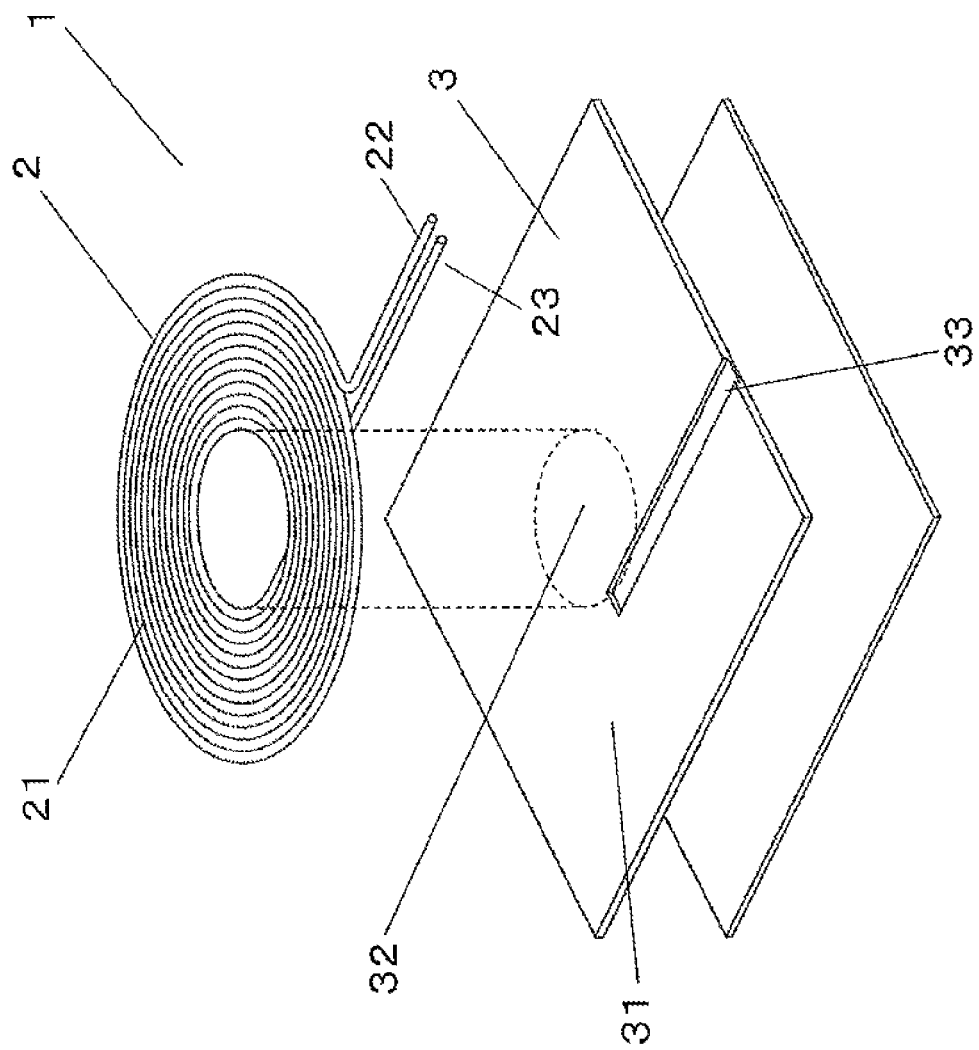
FIG. 1 is an assembly diagram of a non-contact charging module in an embodiment of the present invention.

The invention as recited in claim 1 is a non-contact charging module including: a plane coil section including a wound conducting wire; a magnetic sheet having electric conductivity on which the plane coil section is placed with an insulation sheet interposed therebetween; and a recessed portion or a slit provided in the magnetic sheet and extending from a winding start point of the plane coil section to an end of the magnetic sheet, in which the conducting wire of the plane coil section is housed in the recessed portion or the slit with the insulation sheet pressed into the recessed portion or the slit, and the conducting wire of the plane coil section is insulated from the magnetic sheet having electric conductivity because of the insulation sheet. Thus, it is possible to achieve a reduction in thickness in a state in which the conducting wire and the magnetic sheet are surely insulated from each other.

The invention as recited in claim 2 is the non-contact charging module according to claim 1, in which a width of the recessed portion or the slit is at least three times as large as a diameter of the conducting wire. The conducting wire is surely housed in the recessed portion by the elasticity of the insulation sheet. Therefore, it is possible to realize a reduction in thickness in a state in which the conducting wire and the magnetic sheet are surely insulated from each other.

The invention as recited in claim 3 is the non-contact charging module according to claim 1, in which a diameter of the conducting wire is smaller than 0.3 mm and a thickness of the insulation sheet is 5 to 20 mm. The conducting wire is surely housed in the recessed portion by the elasticity of the insulation sheet. Therefore, it is possible to realize a reduction in thickness in a state in which the conducting wire and the magnetic sheet are surely insulated from each other.

The invention as recited in claim 4 is the non-contact charging module according to claim 1, in which a through-hole smaller than a diameter of the conducting wire is made in a portion of the insulation sheet facing the recessed portion or the slit. Even when the elasticity of the insulation sheet is insufficient, the conducting wire is surely housed in the recessed portion by the elasticity of the insulation sheet. Therefore, it is possible to realize a reduction in thickness in a state in which the conducting wire and the magnetic sheet are surely insulated from each other.

The invention as recited in claim 5 is the non-contact charging module according to claim 1, in which a dimensional expansion ratio of the insulation sheet is 0.05% to 0.1%. The conducting wire is housed in the recessed portion by the elasticity of the insulation sheet even if no hole or the like is formed in the insulation sheet. Therefore, it is possible to realize a reduction in thickness in a state in which the conducting wire and the magnetic sheet are surely insulated from each other.

The invention as recited in claim 6 is the non-contact charging module according to claim 1, in which the insulation sheet includes a cut in a position corresponding to the recessed portion or the slit, the conducting wire is housed in the recessed portion or the slit so as to interpose the insulation sheet between the conducting wire and the magnetic sheet, and the conducting wire of the plane coil section is insulated from the magnetic sheet having electric conductivity because of the insulation sheet. Even if a relatively thick conducting wire is used, it is possible to realize a reduction in thickness in a state in which the conducting wire and the magnetic sheet are surely insulated from each other.

The invention as recited in claim 7 is the non-contact charging module according to claim 6, in which a diameter of the conducting wire of the plane coil section is smaller than a thickness of the magnetic sheet, and a thickness of the magnetic sheet is 20 to 50 µm. Even if a relatively thick conducting wire is used, it is possible to realize a reduction in thickness in a state in which the conducting wire and the magnetic sheet are surely insulated from each other.

The invention as recited in claim 8 is the non-contact charging module according to claim 6, in which a width of the recessed portion or the slit is at least twice as large as a diameter of the conducting wire. Since the insulation sheet is surely interposed between the conducting wire and the magnetic sheet, it is possible to surely insulate the conducting wire and the magnetic sheet from each other and realize a reduction in thickness.

The invention as recited in claim 9 is the non-contact charging module according to claim 6, in which a width of the recessed portion or the slit is at least twice as large as a thickness of the magnetic sheet. Since the insulation sheet is surely interposed between the conducting wire and the magnetic sheet, it is possible to surely insulate the conducting wire and the magnetic sheet from each other and realize a reduction in thickness.

The invention as recited in claim 10 is a non-contact charger comprising the non-contact charging module according to claim 1. It is possible to realize a reduction in thickness in a state in which the conducting wire and the magnetic sheet are surely insulated from each other.

The invention as recited in claim 11 is an electronic apparatus comprising the non-contact charging module according to claim 1. It is possible to realize a reduction in thickness in a state in which the conducting wire and the magnetic sheet are surely insulated from each other.

Embodiment

An embodiment of the present invention is explained below with reference to the drawings. FIG. 1 is an assembly diagram of a non-contact charging module in the embodiment of the present invention. FIGS. 2A to 2D are conceptual diagrams of the non-contact charging module in the embodiment of the present invention. FIG. 2A is a top view of the non-contact charging module, FIG. 2B is a sectional view of the same viewed from an A direction in FIG. 2A, and FIGS. 2C and 2D are sectional views of the non-contact charging module viewed from a B direction in FIG. 2A. FIGS. 3A to 3D are conceptual diagrams of a magnetic sheet of the non-contact charging module in the embodiment of the present invention. FIG. 3A is a top view of the magnetic sheet, FIG. 3B is a sectional view of the magnetic sheet viewed from an A direction in FIG. 3A, and FIGS. 3C and 3D are sectional views of the magnetic sheet viewed from a B direction in FIG. 3A.

Non-contact charging module 1 according to the present invention includes plane coil section 2 including a spirally wound conducting wire and magnetic sheet 3 provided so as to face the surface of coil 21 of plane coil section 2.

As shown in FIG. 1, plane coil section 2 includes coil 21 including a conducting wire wound toward the radial direction so as to draw a swirl on a surface and terminals 22 and 23 provided at both ends of coil 21. Coil 21 includes a conducting wire wound in parallel on a plane. A surface formed by the coil is referred to as coil surface. A thickness direction is the direction in which plane coil section 2 and magnetic sheet 3 are stacked. In this embodiment, coil 21 is wound outward from a bore having a diameter of 20 mm. The outer diameter of coil 21 is 30 mm. That is, coil 21 is wound in a doughnut shape. Coil 21 may be wound in a circular shape or may be wound in a polygonal shape. In the case of the polygonal shape, a corner portion of coil 21 may be bent in a curved line shape.

Winding the conducting wires to leave a space in between decreases the floating capacity between the conducting wire of an upper stage and the conducting wire of a lower stage, thereby making it possible to minimize the alternating-current resistance of coil 21. In addition, the thickness of coil 21 can be minimized by winding the conducting wires densely.

As shown in FIG. 2A, in this embodiment, the conducting wire has a circular shape in cross-section, but an conducting wire having a square shape in cross-section may be employed. However, compared with the conducting wire having a square shape in cross-section, when the conducting wire having a circular shape in cross-section is used, a gap is formed between adjacent conducting wires. Therefore, stray capacitance between the conducting wires decreases, which in turn makes it possible to reduce the alternating-current resistance of coil 21.

In addition, the alternating-current resistance of coil 21 is lower and transmission efficiency can be increased when coil 21 is wound in one stage rather than being wound in two stages in the thickness direction. This is because, when the conducting wire is wound in two stages, stray capacitance is generated between the conducting wire in the upper stage and the conducting wire in the lower stage. Therefore, it is preferable to wind coil 21 in one stage in as many portions as possible rather than being entirely wound in two stages. Winding coil 21 in one stage makes it possible to reduce the thickness of non-contact charging module 1. It should be noted that, the low alternating-current resistance of coil 21 in this case prevents a loss in coil 21. Improving an L value makes it possible to improve power transmission efficiency of non-contact charging module 1, which is dependent on the L value.

In this embodiment, inner diameter x on the inner side of coil 21 shown in FIG. 1 is 10 mm to 20 mm. The outer diameter of coil 21 is about 30 mm. The smaller the inner diameter x, the larger the number of turns of coil 21 can be formed in non-contact charging module 1 of the same size, which in turn makes it possible to improve the 1, value.

Terminals 22 and 23 may be arranged close to each other or may be arranged apart from each other. However, when terminals 22 and 23 are arranged apart from each other, non-contact charging module 1 is more easily mounted.

Magnetic sheet 3 is provided to improve power transmission efficiency of non-contact charging using electromagnetic induction action. As shown in FIG. 2A, magnetic sheet 3 includes flat portion 31, center portion 32, which is the center of magnetic sheet 3 and equivalent to the inner diameter of coil 21, and recessed portion 33. As shown in FIGS. 3A to 3D, center portion 32 does not always need to be formed in a protruding shape. Recessed portion 33 may be slit 34. Recessed portion 33 or slit 34 is not always necessary. However, as shown in FIGS. 2C and 2D, when recessed portion 33 or slit 34 is provided, the conducting wire from a winding end of coil 21 to terminal 23 can be housed in recessed portion 33 or slit 34. Therefore, a reduction in size in the thickness direction is made possible. Specifically, recessed portion 33 or slit 34 is formed to be substantially perpendicular to the end of magnetic sheet 3 and overlap a tangential line of the outer circumference of center portion 32. Recessed portion 33 or slit 34 formed in this manner makes it possible to form terminals 22 and 23 without bending the conducting wire. Note that, in this case, the length of recessed portion 33 or slit 34 is about 15 mm to 20 mm. Meanwhile, the length of recessed portion 33 or slit 34 depends on the inner diameter of coil 21. Recessed portion 33 or slit 34 may be formed in a portion where the end of magnetic sheet 3 and the outer circumference of center portion 32 are closest to each other. Consequently, it is possible to minimize the area where recessed portion 33 or slit 34 is formed and to improve the transmission efficiency of non-contact charging module 1. Note that, in this case, the length of recessed portion 33 or slit 34 is about 5 mm to 10 mm. In both of the placements, the inner side end of recessed portion 33 or slit 34 is connected to center portion 32. Recessed portion 33 or slit 34 may be placed in a different way. Stated differently, it is preferable to place coil 21 in a one-stage structure. In this case, it is possible to form all turns in the radial direction of coil 21 in the one-stage structure or to form a part of the turns in the one-stage structure while forming the other parts in a two-stage structure. Therefore, one of terminals 22 and 23 can be drawn out from the outer circumference of coil 21. However, the other has to be drawn out from the inner side. Therefore, a wound portion of coil 21 and foot portion 24 (see FIG. 4D) always overlap in the thickness direction. Therefore, recessed portion 33 or slit 34 may be provided in the overlapping portion, and foot portion 24 only is housed in recessed portion 33 or slit 34. Note that foot portion 24 means a portion extending from the winding end of coil 21 to terminal 22 or 23. In the case of recessed portion 33, since no through-hole or slit is provided in magnetic sheet 3, it is possible to prevent a magnetic flux from leaking and improve the power transmission efficiency of non-contact charging module 1. On the other hand, in the case of slit 34, it is easy to form magnetic sheet 3. In the case of recessed portion 33, the cross-sectional shape of recessed portion 33 is not limited to a square shape as shown in FIG. 4C and may be an arc shape or rounded shape.

In this embodiment, as magnetic sheet 3, a Ni—Zn ferrite sheet, a Mn—Zn ferrite sheet, a Mg—Zn ferrite sheet, or the like can be used. The ferrite sheet can reduce the alternating-current resistance of coil 21 compared with an amorphous metal magnetic sheet.

As shown in FIGS. 3C and 3D, at least high-saturation magnetic flux density material 3a and high-magnetic permeability material 3b are stacked in magnetic sheet 3. Even when high-saturation magnetic flux density material 3a and high-magnetic permeability material 3b are not stacked, it is advisable to use high-saturation magnetic flux density material 3a having saturation magnetic flux density equal to or higher than 350 mT and thickness of at least 300 μm.

It is preferable to place coil 21 in a one-stage structure. In this case, it is possible to form all turns in the radial direction of coil 21 in the one-stage structure or to form a part of the turns in the one-stage structure while forming the other parts in a two-stage structure. Therefore, one of terminals 22 and 23 can be drawn out from the outer circumference of coil 21. However, the other has to be drawn out from the inner side. Therefore, a wound portion of coil 21 and foot portion 24 always overlap in the thickness direction.

Therefore, in the present invention, recessed portion 33 or slit 34 is linearly provided in the overlapping portion. In particular, recessed portion 33 or slit 34 is linear recessed portion 33 or slit 34 that is parallel to a tangential line of the circumference of an inner circumferential circle of the surface of coil 21 and extends in a shortest distance from a winding start or winding end point of the coil surface to the end of magnetic sheet 3. The tangential line of the inner circumference of the inner circumferential surface of coil 21 is a tangential line of the inner circumference of an inner circumferential circle in a place where recessed portion 33 or slit 34, which extends from the vicinity of the outer circumference of the inner circumferential circle of the surface of coil 21, is close to the outer circumference of the inner circumferential circle of the surface of coil 21. Forming linear portion 33b in this way makes it possible to form terminals 22 and 23 without bending the conducting wire on magnetic sheet 3. That is, when recessed portion 33 or slit 34 is provided, in order to fit the conducting wire in recessed portion 33 or slit 34, the conducting wire has to be bent in the thickness direction from flat portion 31 toward recessed portion 33 or slit 34. Therefore, since the conducting wire is not bent on magnetic sheet 3 in a portion where the conducting wire is fit from flat portion 31 toward recessed portion 33 or slit 34, it is possible to achieve a reduction in thickness while maintaining the strength of the conducting wire. Note that, in this case, the length of linear portion 33b is about 15 mm to 20 mm. Coil 21 may be wound in a polygonal shape. In that case, it is advisable to provide recessed portion 33 or slit 34 linearly parallel to the shape of a space formed by the inner side end of the surface of coil 21 or a tangential line of the shape and extending in a shortest distance from the winding start or winding end point of the coil surface to the end of magnetic sheet 3.

Recessed portion 33 or slit 34 that is perpendicular to the tangential line of the circumference of the inner circumferential circle of the surface of coil 21 and extends in a shortest distance from the winding start or winding end point of the coil surface to the end of magnetic sheet 3 may be formed on magnetic sheet 3. Consequently, it is possible to minimize the area where recessed portion 33 or the slit is formed and improve the transmission efficiency of non-contact charging module 1. Stated differently, when recessed portion 33 or slit 34 is provided, a part of magnetic sheet 3 is lost or reduced in thickness. Therefore, there is a concern that a magnetic flux leaks from recessed portion 33 or slit 34 and the power transmission efficiency of the non-contact charging module falls a little, accordingly. Therefore, minimizing the area where recessed portion 33 is formed makes it possible to achieve a reduction in thickness while minimizing the leak of the magnetic flux and maintaining the power transmission efficiency of the non-contact charger. Note that, in this case, the length of linear portion 33b is about 5 mm to 10 mm. Note that, since recessed portion 33 or slit 34 is provided on the tangential line of the outer circumference of center portion 32 at a position corresponding to the shortest distance to the end of magnetic sheet 3, recessed portion 33 or slit 34 has a shape parallel to end 3a of magnetic sheet 3. Note that coil 21 may be wound in a polygonal shape. In that case, recessed portion 33 or slit 34 may be perpendicular to the shape of the space formed by the inner side end of the surface of coil 21 or the tangential line of the shape. Therefore, it is advisable to provide recessed portion 33 or slit 34 linearly extending at the shortest distance from the winding start or winding end point of the coil surface to the end of magnetic sheet 3. Note that, in general, coil 21 is wound in a plane shape from the inner side to the outer side, so that recessed portion 33 or slit 34 extends from the winding start point to the end of magnetic sheet 3.

In FIGS. 2 and 3, for example, recessed portion 33 or slit 34 is parallel to sides of a pair of opposed ends of square magnetic sheet 3 and perpendicular to sides of the other pair of opposed ends. This is because magnetic sheet 3 in this embodiment is square. However, the shape of magnetic sheet 3 is not limited to the square shape. Various shapes such as a circular shape and a polygonal shape may be used. Therefore, for example, the shape of magnetic sheet 3 is a polygonal shape and recessed portion 33 or slit 34 is perpendicular to a side that is in contact with one end of recessed portion 33 or slit 34, which makes it possible to minimize the area of recessed portion 33 or slit 34 in a convenient polygonal magnetic sheet. In particular, the shape of magnetic sheet 3 is the square shape and recessed portion 33 or slit 34 is parallel to the sides of a pair of opposed ends of magnetic sheet 3 and perpendicular to the sides of the other pair of opposed ends. Consequently, it is possible to minimize the area of recessed portion 33 or slit 34 in a most convenient square magnetic sheet.

Therefore, recessed portion 33 or slit 34 is provided in a portion where coil 21 and foot portion 24 overlap each other. The surface of coil 21 is provided on flat portion 31. Note that recessed portion 33 or slit 34 may be provided slightly longer or shorter. However, it is preferable that recessed portion 33 or slit 34 be provided so as to cover at least 80% of the portion where coil 21 and foot portion 24 overlap each other.

In FIGS. 2 and 3, magnetic sheet 3 has a size of about 33 mm×33 mm. Thickness d1 of center portion 32 shown in FIG. 2C is 0.2 mm. In FIG. 3C, d2 denotes the thickness of magnetic sheet 3. Magnetic sheet 3 includes stacking high-saturation magnetic flux density material 3a, which is stacked on high-magnetic permeability material 3b while the respective thicknesses of high-saturation magnetic flux density material 3a and high-magnetic permeability material 3b are set in such a way that d2, d3, and d4 are equal to 0.6 mm, 0.15 mm, and 0.45 mm, respectively.

Next, insulation between magnetic sheet 3 and plane coil section 2 in the case of conductive magnetic sheet 3 is explained. First, a description will be provided regarding a case where recessed portion 33 is formed. Note that the term "conductive magnetic sheet 3" does not necessarily mean that all portions of magnetic sheet 3 are conductive, and the term also refers to a case where at least a part of magnetic sheet 3 is conductive, for example, as illustrated in FIGS. 3C and 3D where reference numerals 3a and 3b denote a conductive sheet and a nonconductive sheet, respectively.

Figure 4A:
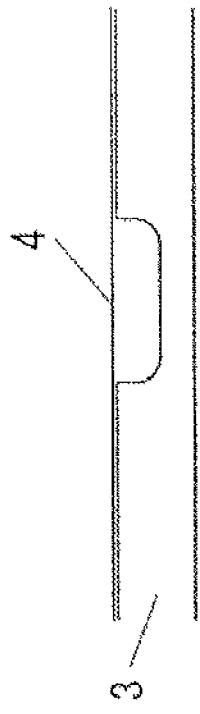
FIGS. 4A to 4D are diagrams of the magnetic sheet in which a recessed portion is formed and a plane coil section in the embodiment of the present invention.
Figure 4B:
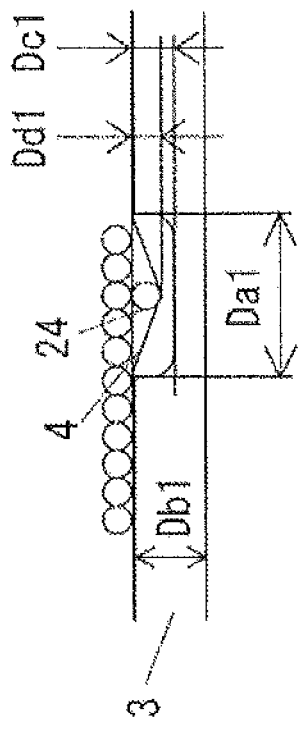
Figure 4C:
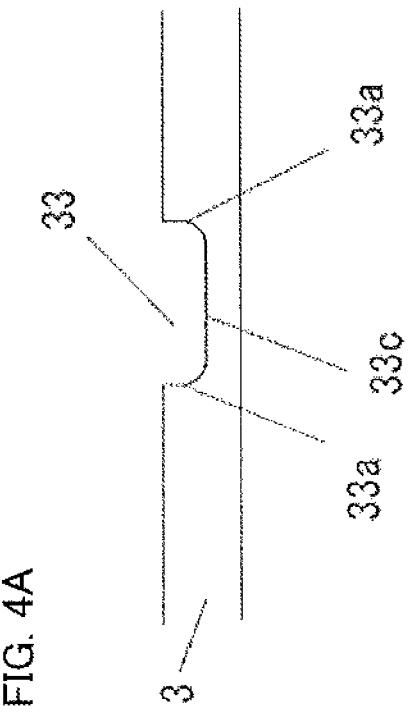
Figure 4D:
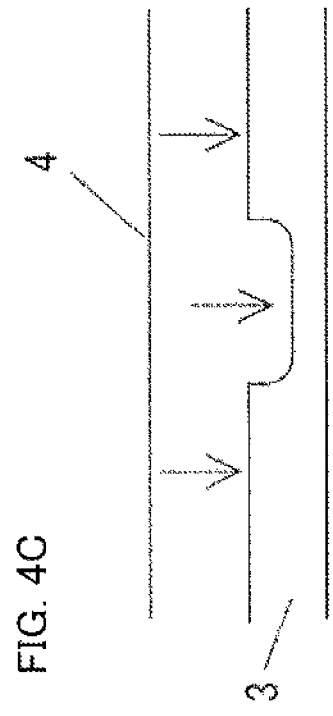

FIGS. 4A to 4D are diagrams of the magnetic sheet in which the recessed portion is formed and the plane coil section in the embodiment of the present invention. FIG. 4A is a sectional view of the recessed portion of the magnetic sheet. FIG. 4B is a sectional view of the magnetic sheet and the insulation sheet before bonding. FIG. 4C is a sectional view of the magnetic sheet and the insulation sheet after bonding. FIG. 4D is a sectional view of the insulation sheet and the foot portion of the coil. These sectional views are sectional views taken along line C-C of the recessed portion shown in FIG. 3A.

In this embodiment, since magnetic sheet 3 is conductive, sidewall 33a and bottom surface 33c of recessed portion 33 are also conductive. Therefore, the conducting wire and foot portion 24 thereof should not be in contact with any one of sidewall 33a and bottom surface 33c of recessed portion 33. Therefore, insulation sheet 4 is bonded at least onto the surface side of the magnetic sheet 3 where coil 21 is to be placed. Plane coil section 2 is placed on insulation sheet 4. At this point, foot portion 24 presses down insulation sheet 4 corresponding to recessed portion 33 and is housed in recessed portion 33. Consequently, it is possible to bring foot portion 24 into contact with coil 21 and to house foot portion 24 in recessed portion 33. In order to insulate plane coil section 2 and magnetic sheet 3 from each other, insulation sheet 4 is provided on at least a portion of magnetic sheet 3 where plane coil section 2 is placed. Preferably, insulation sheet 4 is configured to cover the entire surface of magnetic sheet 3, which makes it possible to surely insulate plane coil section 2 and magnetic sheet 3 from each other. Insulation sheet 4 not only bonds plane coil section 2 and magnetic sheet 3 but also insulates plane coil section 2 and magnetic sheet 3 from each other. Therefore, insulation sheet 4 is always interposed between plane coil section 2 and magnetic sheet 3.

In this embodiment, a base material PET, PEN, acrylic, or polyester with an acrylic or silicone adhesive may be used. It is preferable that the dimensional expansion ratio of insulation sheet 4 be 0.05% to 0.1%. The term "dimensional expansion ratio" is a ratio expressed by (length after processing-length before processing)/length before processing, and the term "processing" means that insulation sheet 4 is expanded by foot portion 24.

It is preferable that the diameter of the conducting wire be about 0.3 mm at most when such a form is adopted.

It should be noted that a small hole may be made in order to remove the air between recessed portion 33 and insulation sheet 4 and increase the elasticity of insulation sheet 4. When a small hole is made, the size of the hole is desirably equal to or larger than 200 μm. The hole is preferably made closer to the center side end of recessed portion 33 or slit 34 and at a position within a range of ½ from the center side of the slit length.

In this embodiment, width Da1 of the slit is 1.34 mm, thickness Db1 of magnetic sheet 3 is 0.6 mm, diameter Dc1 of the conducting wire is 0.25 mm, and depth Dd1 of recessed portion 33 is 0.3 mm. In this case, since diameter Dc1 (0.25 mm) of the conducting wire is relatively small with respect to thickness Db1 (0.6 mm) of magnetic sheet 3. For this reason, recessed portion 33 is provided on magnetic sheet 3, rather than slit 34. Consequently, the magnetic field can be prevented from easily leaking from magnetic sheet 3 in power transmission. When diameter Dc of the conducting wire is not greater than 75% of thickness Db1 of magnetic sheet 3, recessed portion 33 is preferably formed. More preferably, diameter Dc of the conducting wire is not greater than 50% of thickness Dh1 of magnetic sheet 3. It is preferable that width Da1 of the slit be at least three times as large as diameter Dc1 of the conducting wire. When width Da1 of the slit is at least three times as large as diameter Dc1 of the conducting wire, insulation sheet 4 can sufficiently house foot portion 24 in recessed portion 33.

In the manner described above, the conducting wire is housed in first slit 34 with insulation sheet 4 interposed therebetween.

The structure described above is particularly useful for a secondary side non-contact charging module, which is a reception side. That is, since the value of an electric current flowing through a coil and the value of voltage of the electric current are relatively small in the secondary side non-contact charging module, such a small diameter of conducting wire, which is 0.25 mm, is sufficient. On the other hand, since a housing itself of the secondary side non-contact charging module is preferably reduced in size, a distance between metal closest to plane coil section 2 and plane coil section 2 is extremely small compared with a primary side non-contact charging module. Therefore, in order to sufficiently prevent the influence of the metal, magnetic sheet 3 is thick compared with the primary side non-contact charging module. As a result, the diameter of the conducting wire is small and the thickness of magnetic sheet 3 is large compared with the primary side non-contact charging module. Therefore, recessed portion 33 is often formed on magnetic sheet 3. In the case of recessed portion 33, when pressed into recessed portion 33, the conductive conducting wire approaches to bottom surface 33c of recessed portion 33. Since insulation sheet 4 is provided with slit 41, insulation sheet 4 needs to have elasticity. In this embodiment, the thickness of insulation sheet 4 is set to a small thickness, which is 10 µm. The thickness of insulation sheet 4 is preferably not greater than 5 to 20 µm.

That is, the non-contact charging module includes the plane coil section including the spirally wound conducting wire, the magnetic sheet provided so as to face the coil surface with the insulation sheet interposed therebetween, and the recessed portion or the slit provided on the magnetic sheet and extending from the winding start or winding end point of the coil surface to the end of the magnetic sheet. In the magnetic sheet, at least a part of the portion where the recessed portion or the slit is formed is conductive. The conducting wire is pressed against the insulation sheet into the recessed portion or the slit and is thereby housed in the recessed portion or the slit. Therefore, it is possible to achieve a reduction in thickness in a state in which the conducting wire and the magnetic sheet are surely insulated from each other.

Since the width of the recessed portion is at least three times as large as the diameter of the conducting wire, the conducting wire is surely housed in the recessed portion by the elasticity of the insulation sheet. Therefore, it is possible to achieve a reduction in thickness in a state in which the conducting wire and the magnetic sheet are surely insulated from each other.

Since the diameter of the conducting wire is smaller than 0.3 mm and the thickness of the insulation sheet is between 5 and 20 µm, the conducting wire is surely housed in the recessed portion by the elasticity of the insulation sheet. Therefore, it is possible to achieve a reduction in thickness in a state in which the conducting wire and the magnetic sheet are surely insulated from each other.

Even when the elasticity of the insulation sheet is insufficient, making a through-hole smaller than the diameter of the conducting wire in a portion of the insulation sheet facing the recessed portion or slit allows the conducting wire to be surely housed in the recessed portion by the elasticity of the insulation sheet. Therefore, it is possible to achieve a reduction in thickness in a state in which the conducting wire and the magnetic sheet are surely insulated from each other.

Next, a description will be provided regarding a case where slit 34 is formed. In the case of slit 34, magnetic sheet 3 and plane coil section 2 may be insulated by the same method as that used in the case of recessed portion 33 or can be insulated by a method to be described below. The method to be described below can be applied to recessed portion 33 as well, but the method described above is preferable.

Figure 5:
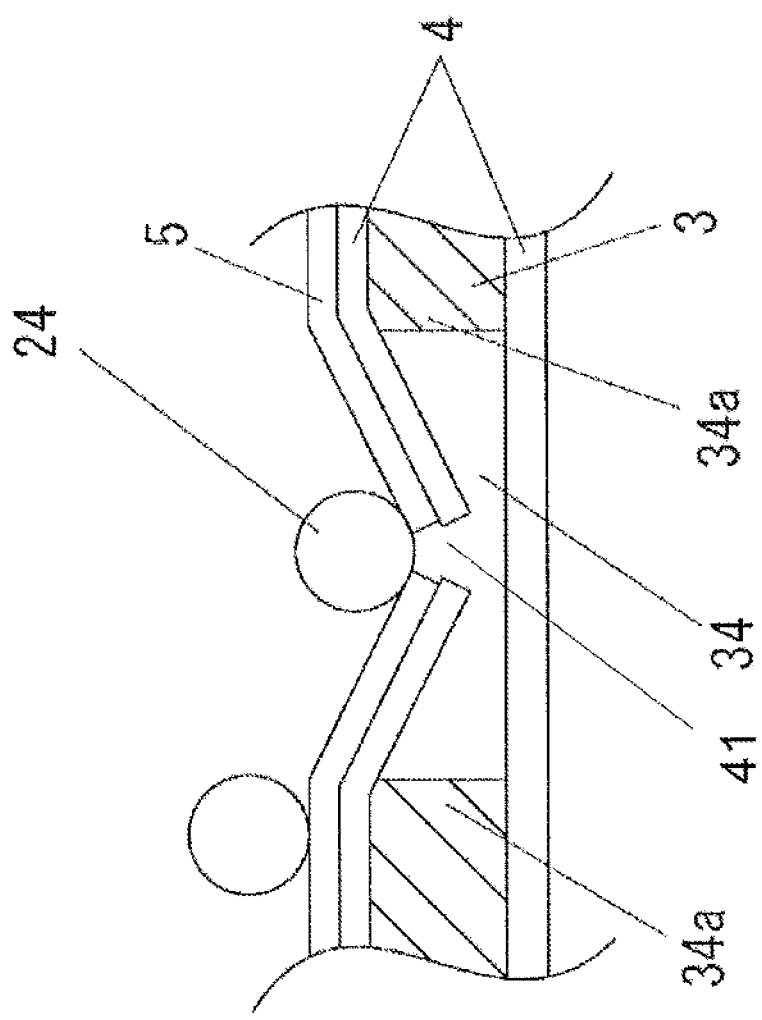
FIG. 5 is an enlarged sectional view of the magnetic sheet in which a slit is formed and the plane coil section in the embodiment of the present invention.

FIG. 5 is an enlarged sectional view of the magnetic sheet in which the slit is formed and the plane coil section in the embodiment of the present invention. FIG. 6 are sectional views of the magnetic sheet in which the slit is formed and the plane coil section in the embodiment of the present invention. FIG. 6A is a sectional view taken along line C-C of the insulation sheet in which the slit is formed instead of the recessed portion in FIG. 3A. FIG. 6B is a sectional view taken along line D-D of the insulation sheet in which the slit is formed instead of the recessed portion in FIG. 3A.

Non-contact charging module 1 in this embodiment includes plane coil section 2 including the spirally wound conducting wire, magnetic sheet 3 provided so as to face the surface of coil 21 with insulation sheet 4 interposed therebetween, and first slit 34 provided on the magnetic sheet and extending from the winding start or winding end point of the coil surface to the end of magnetic sheet 3. Second slit 41 (a cut) is provided on insulation sheet 4 in a position corresponding to (facing) first slit 34. Foot portion 24 of the conducting wire is housed in first slit 34 with insulation sheet 4 interposed therebetween. Note that, in this embodiment, insulation sheets 4 are respectively provided on both surfaces of magnetic sheet 3. Since second slit 41 is the cut, first slit 34 is thicker than second slit 41.

That is, if magnetic sheet 3 is conductive, magnetic sheet 3 and the conducting wire are brought into conduction, and non-contact charging module 1 stops functioning. Therefore, providing insulation sheet 4 between plane coil section 2 and magnetic sheet 3 allows plane coil section 2 and magnetic sheet 3 to be insulated from each other. At this point, since sidewall 34a of slit 34 is also conductive, if the conducting wire and sidewall 34a come into contact with each other, non-contact charging module 1 stops functioning. Therefore, second slit 41 is provided on insulation sheet 4 in a position corresponding to (facing) first slit 34. In FIG. 5, bonding sheet 5 is provided between insulation sheet 4 and the conducting wire. Both surfaces of bonding sheet 5 can be bonded. Therefore, it is possible to fix magnetic sheet 3 and the conducting wire.

In this embodiment, width Da2 of the slit is 1.34 mm, thickness Db2 of magnetic sheet 3 is 0.46 mm, and diameter Dc2 of the conducting wire is 0.35 mm. Width Da2 (1.34 mm) of the slit is at least twice as large as thickness Db2 (0.46 mm) of magnetic sheet 3 and line diameter Dc2 (0.35 mm) of the conducting wire. That is, since the thickness of sidewall 34a is thickness Db2 (0.46 mm) of magnetic sheet 3 and sidewall 34a is present on both left and right sides of the conducting wire, a portion of insulation sheet 4 pressed into slit 34 needs to be twice or more. Since the conducting wire has to be housed in slit 34, the relation, Da2>=2×Db2>=2×Da2, is preferably satisfied. Width Da1 of the slit is preferably at least three times as large as diameter Dc1 of the conducting wire.

In this way, the conducting wire is housed in first slit 34 with insulation sheet 4 interposed therebetween.

The structure described above is particularly useful for the primary side non-contact charging module, which is the transmission side. That is, since the value of an electric current flowing through the coil and the value of voltage of the electric current are large in the primary side non-contact charging module, the diameter of the conducting wire has a large thickness, which is 0.35 mm. On the other hand, since a housing itself of the primary side non-contact charging module is large, a distance between metal closest to plane coil section 2 and plane coil section 2 is large compared with the secondary side non-contact charging module. Therefore, magnetic sheet 3 is thin compared with the secondary side non-contact charging module. As a result, the diameter of the conducting wire is large and the thickness of magnetic sheet 3 is small compared with the secondary side non-contact charging module. Therefore, slit 34 is often formed on magnetic sheet 3. In the case of slit 34, compared with the recessed portion, even if the conducting wire is pressed into slit 34, there is no bottom surface of magnetic sheet 3 under the conductive conducting wire (in the case of this embodiment, insulation sheet 4 different from insulation sheet 4 in which slit 41 is formed is bonded). Since slit 41 is provided, insulation sheet 4 does not need to have elasticity. Therefore, in this embodiment, the thickness of insulation sheet 4 is set to a large thickness, which is 30 µm. The thickness of insulation sheet 4 is preferably 20 to 50 µm such that there is no reduction in strength even if the slit is formed. In insulation sheet 4, a base material PET, PEN, acrylic, or polyester an acrylic or silicone adhesive is preferably used for insulation sheet 4. The diameter of the conducting wire is smaller than the thickness of the magnetic sheet.

As described above, the non-contact charging module includes the plane coil section including the spirally wound conducting wire, the magnetic sheet provided so as to face the coil surface with the insulation sheet interposed therebetween, and the first slit provided on the magnetic sheet and extending from the winding start or winding end point of the coil surface to the end of the magnetic sheet. At least a part of the portion of the magnetic sheet where the first slit is formed is conductive. The second slit is provided on the insulation sheet in the position corresponding to the first slit. The conducting wire is housed in the first slit with the insulation sheet interposed therebetween. Therefore, it is possible to achieve a reduction in thickness in a state in which the conducting wire and the magnetic sheet are surely insulated from each other.

The width of slit 34 is at least twice as large as the diameter of the conducting wire. Therefore, the insulation sheet is surely interposed between the conducting wire and the magnetic sheet, which makes it possible to surely insulate the conducting wire and the magnetic sheet from each other and achieve a reduction in thickness.

The width of slit 34 is at least twice as large as the thickness of the magnetic sheet. Therefore, the insulation sheet is surely interposed between the conducting wire and the magnetic sheet, which makes it possible to surely insulate the conducting wire and the magnetic sheet from each other and achieve a reduction in thickness.

The diameter of the conducting wire is smaller than the thickness of the magnetic sheet, and the thickness of the insulation sheet is 20 to 50 µm. Therefore, the insulation sheet is surely interposed between the conducting wire and the magnetic sheet, which makes it possible to surely insulate the conducting wire and the magnetic sheet from each other and achieve a reduction in thickness.

Moreover, coil 21 is not limited to be wound in an annular shape and may be wound in a square shape or a polygonal shape. Furthermore, the effect of this application can also be obtained by performing winding in such a way that the inner side is wound in a plurality of stages one on top of another and the outer side is wound in the number of stages smaller than the number of stages for the inner side, for example, a three-stage structure for the inner side and a two-stage structure for the outer side.

Next, a non-contact charger including non-contact charging module 1 according to the present invention is explained. A non-contact transmitting apparatus includes a charger including a power transmission coil and a magnetic sheet and a main apparatus including a power reception coil and a magnetic sheet. The main apparatus is an electronic apparatus such as a cellular phone. A circuit on the charger side includes a rectifying and smoothing circuit section, a voltage conversion circuit section, an oscillation circuit section, a display circuit section, a control circuit section, and the power transmission coil. A circuit on the main apparatus side includes the power reception coil, a rectifying circuit section, a control circuit section, and a load L mainly formed of a secondary battery.

Power transmission from the charger to the main apparatus is performed using electromagnetic induction action between the power transmission coil of the charger, which is the primary side and the power reception coil of the main apparatus, which is the secondary side.

The non-contact charger in this embodiment includes the non-contact charging module explained above. Therefore, it is possible to reduce the size and the thickness of the non-contact charger in a state in which the sectional area of the plane coil section is sufficiently secured with improved power transmission efficiency.

The disclosures of the specifications, the drawings, and the abstracts included in Japanese Patent Application No. 2011-019481 filed on Feb. 1, 2011 and Japanese Patent Application No. 2011-019482 filed on Feb. 1, 2011 are incorporated herein by reference in their entirety.

INDUSTRIAL APPLICABILITY

With the non-contact charging module according to the present invention, it is possible to reduce the thickness of the non-contact charging module in a state in which the sectional area of the plane coil section is sufficiently secured. Therefore, the non-contact charging module is useful as non-contact charging modules of various electronic apparatuses including portable terminals such as a cellular phone and a portable computer and portable apparatuses such as a video camera.

REFERENCE SINGS LIST

1 Non-contact charging module
2 Plane coil section
21 Coil
22, 23 Terminals
24 Foot portion
3 Magnetic sheet
31 Flat portion
32 Center portion
33 Recessed portion
34 Slit (first slit)

The invention claimed is:
1. A non-contact charging module comprising:
a plane coil section including a wound conducting wire;
a magnetic sheet having electric conductivity on which the plane coil section is placed, the magnetic sheet being provided so as to be opposed to a coil surface of the plane coil section on a side where the plane coil section is placed, with an insulation sheet interposed therebetween; and a recessed portion or a slit provided in the magnetic sheet and extending from a winding start point of the coil surface to an end of the magnetic sheet, wherein a portion of the conducting wire of the plane coil section where the coil surface including the wound conducting wire and the conducting wire from the winding start point of the coil surface to the end of the magnetic sheet are layered, is housed in the recessed portion or the slit with the insulation sheet pressed into the recessed portion or the slit, to prevent the conducting wire of the plane coil section from coming into contact with a sidewall and a bottom surface of the recessed portion or a sidewall of the slit, and the conducting wire of the plane coil section is insulated from the conductive magnetic sheet because of the insulation sheet.

2. The non-contact charging module according to claim 1, wherein a width of the recessed portion or the slit is at least three times as large as a diameter of the conducting wire.

3. The non-contact charging module according to claim 1, wherein a diameter of the conducting wire is smaller than 0.3 mm, and a thickness of the insulation sheet is 5 to 20 µm.

4. The non-contact charging module according to claim 1, wherein a through-hole smaller than a diameter of the conducting wire is made in a portion of the insulation sheet facing the recessed portion or the slit.

5. A non-contact charger comprising the non-contact charging module according to claim 1.

6. A non-contact charging module comprising:

a plane coil section including a wound conducting wire;

a magnetic sheet having electric conductivity on which the plane coil section is placed, the magnetic sheet being provided so as to be opposed to a coil surface of the plane coil section on a side where the plane coil section is placed, with an insulation sheet interposed therebetween; and a slit provided in the magnetic sheet and extending from a winding start point of the coil surface to an end of the magnetic sheet, wherein the insulation sheet includes a cut in a position corresponding to the slit, the conducting wire is housed in the slit so as to interpose the insulation sheet between the conducting wire and the magnetic sheet, and the conducting wire of the plane coil section is insulated from the conductive magnetic sheet because of the insulation sheet.

7. The non-contact charging module according to claim 6, wherein a diameter of the conducting wire of the plane coil section is smaller than a thickness of the magnetic sheet, and the thickness of the insulation sheet is 20 to 50 µm.

8. A non-contact charger comprising the non-contact charging module according to claim 6.

9. The non-contact charging module according to claim 1, wherein the insulation sheet is loosely interposed between the magnetic sheet and the coil surface of the plane coil section.

* * * * *